United States Patent Office 3,428,108
Patented Feb. 18, 1969

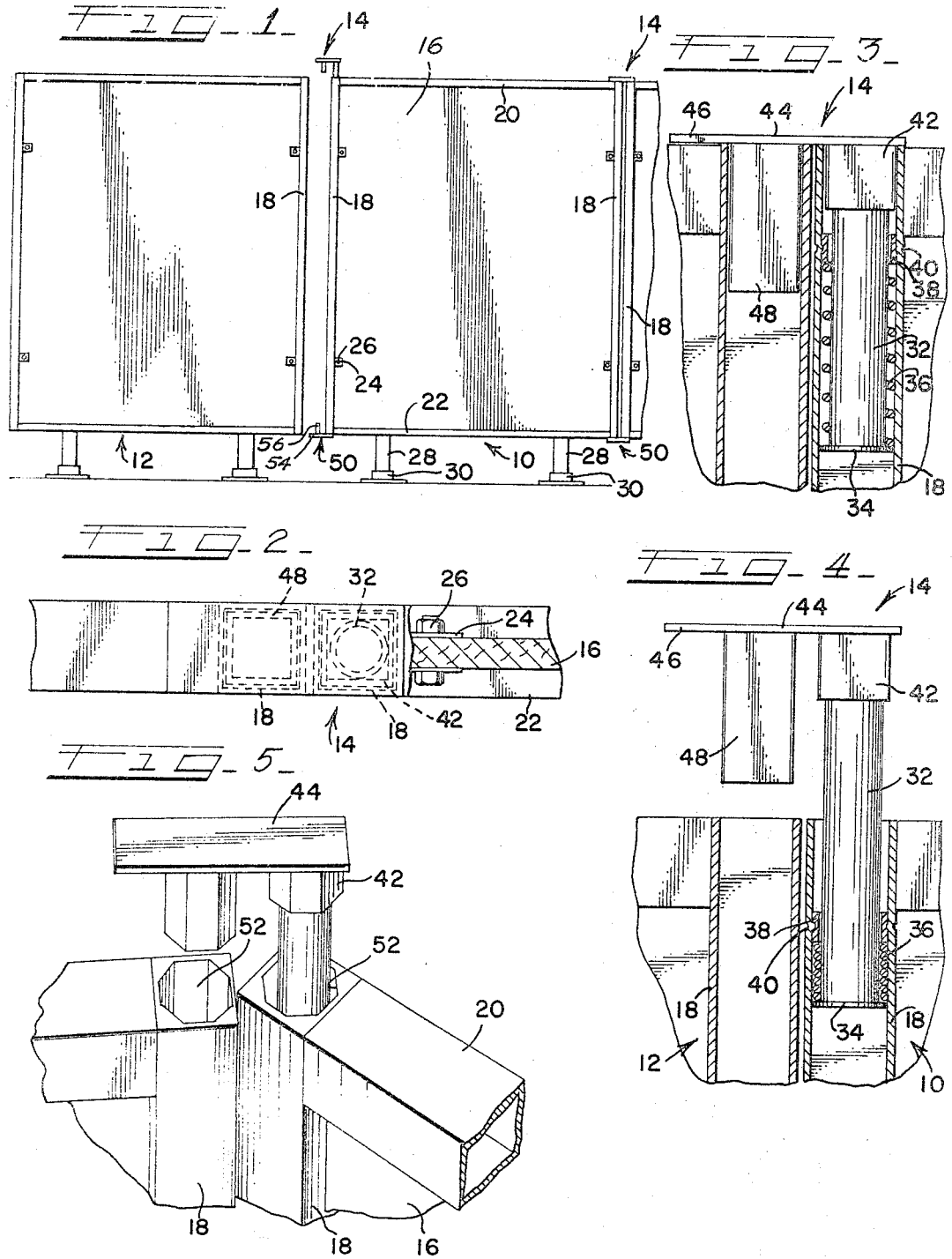

3,428,108
PANEL CONNECTOR
Isadore Singer, Chicago, Ill., assignor to Singer Partitions, Inc., Chicago, Ill., a corporation of Illinois
Filed Dec. 20, 1967, Ser. No. 692,199
U.S. Cl. 160—135          7 Claims
Int. Cl. E06b 3/92, 9/00

ABSTRACT OF THE DISCLOSURE

A combination panel and connector unit for connection to a similar panel, comprising a panel center section, frame means supporting the center section, the frame means including vertically disposed frame members in the form of hollow tubes, and a connector unit for connecting such panel to a correspondingly formed adjacent panel, wherein the connector means comprises at least one generally U-shaped connector means in which a shaft is provided for vertical movement inside the tube, spring retaining collar means are fixed inside the tube and on an axially inner portion of the shaft, and wherein a spring is disposed inside the tube and outside the shaft, between the two retaining means, and which also includes an arm extending outwardly sleeve attached to the arm for reception in an adjacent panel.

The shafts and sleeves may be sized and shaped to provide a hinge action, or permit limited movement of connected panels, or no relative movement, as desired.

BACKGROUND OF THE INVENTION

Field of the invention

The field of the invention is that of sight dividers, or other movable or demountable panels or partitions, for use in erecting temporary, non-structural wall panels or the like. The invention principally relates to the combination of a panel and connector means having a snap-in action which is of simple but durable construction, and which is useful for mounting an array of panel units to form a temporary wall, screen, or guard, such as for use as a room divider in school rooms or the like. Generally, the invention relates to the snap-in connector unit which may be in the form of a spring-loaded hinge, allowing relative movement of adjacently disposed panel units, or may be in the form of a combined connector and lock means for orienting a second panel in a desired position in relation to a first panel, holding the two panels together in a side by side, nearly abutting relation.

Description of the prior art

Today, a concept which is achieving an increasing popularity in schools, for example, is the concept of constructing a small number of relatively large rooms or the like which are free from columns, pillars or wall panels, and which may then be subdivided by the use of demountable partitions or panels so as to accommodate classes or gatherings of different sizes, so that each class or group of students may be convened in an area which is convenient and desirable in relation to the size of such group, in which the panels serve to act as a sight divider, and, to a certain extent, a sound barrier between adjacent groups of students or the like.

Units generally having this purpose are known, however, many such units have lacked at least one desirable feature which is necessary to make such system a success. Thus, from the standpoint of simple operation, its is necessary that the panels be easily assembled and connected to each other without acquiring substantial a mounts of time or effort, or the use of skilled labor, or substantial strength, for erecting the same.

Demountable partitions are well known which are adapted to stand by themselves free from connecting structure, and other panels are known which are suitable for being wedged between a floor and a ceiling, or the like, to maintain them in a fixed position. Likewise, a plurality of folding type panels are well known, in which a group of panel units are preconnected to each other and are adapted to be unfolded to form a screen or the like.

Other panel and space divider or room divider partition systems are known in which the panels are adapted to be fastened together by means of bolts, nuts, or similar fastening means.

However, the present invention is directed to providing a panel which includes a connector member which is adapted for immediate connection to a similar panel, and which, because of the simplicity thereof, is not dependent on a particular floor-to-ceiling height, does not comprise a permanently combined set of panels which are heavy and cumbersome, which does not require the use of tools or skilled labor to assemble, and which may be assembled in an array of any desired numbers or combinations of panels.

SUMMARY OF THE INVENTION

Accordingly, an object of the invention is to provide a panel which includes connector means having a simple snap-in action on at least one upper corner thereof, and which includes like means at a lower corner of the panel for receiving and locating an adjacent panel.

Another object is to provide a panel which may be placed in a desired position and which may be simply and rapidly connected to a similar panel disposed adjacent thereto, and wherein the combined panels are connected by a hinge action, or, if desired, by an action which serves to lock the panels into a given angular relation with respect to one another.

Further objects of the invention include providing such a panel and connector unit which is simple, easy to construct which facilitates ready erection and which may be easily disassembled, and which requires no special equipment or tools, and which may be manipulated effectively without particular mechanical knowledge or skill.

The present invention accomplished these objects and others which are inherent therein, by providing a panel unit having a center section and tubular frame members on the ends thereof, connectors at the corners, and in which at least one connector is a U-shaped, spring-loaded connector having a shaft disposed on one frame tube, held therein by spring means, and in which a connector sleeve is joined thereto by an arm extending between the sleeve and the shaft, and wherein the connector sleeve is adapted to be received in the tubular frame of an adjacent panel.

The manner in which these objects are attained will become more apparent when considered in conjunction with a description of the preferred embodiments of the invention, as claimed herein, and as shown in the drawings, in which like reference numerals indicate corresponding parts throughout.

BRIEF DESCRIPTION OF THE DRAWINGS

FIG. 1 is a side elevational view showing the combination panel units of the invention and the manner in which they are connected to one another by the connector assemblies of the present invention.

FIG. 2 is a top view, partly in plan and partly in section, on an enlarged scale, showing the connector unit of the present invention.

FIG. 3 is a vertical sectional view, with portions broken away, showing the connector unit of the present invention in position holding an adjacent panel place.

FIG. 4 is a vertical sectional view with portions broken away, showing the panel connector unit in an extended position as it is being connected to an adjacent panel.

FIG. 5 is a isometric view, with portions broken away, showing another embodiment of the panel connector about to be placed into position of use with an adjacent panel is disposed at an angle relative to the first panel.

Referring now to the drawings in greater detail, FIG. 1 shows a pair of panels 10, 12 and the manner in which they are held in place by a typical fastener assembly 14 of the invention. As shown in FIG. 1, a particular panel 10 comprises a center section 16, a pair of tubular side frame elements 18, a top frame unit 20, and a bottom frame unit 22, all preferably being made of a tubular material having a rectangular cross section and made of a relatively thin gauge metal.

The center section 16 is held in place by clip units 24 secured by fasteners 26. Attached to the bottom frame member 22 are a plurality of legs 28 terminating in foot or toe units 30 which are adapted to extend outwardly to either side of the panels in order to allow them to stand upright in position of use without further support. In various constructions the center section 16 may be made from wood, wood fiber, thin gauge metal, or the like. Likewise, the center section may comprise material having a specialized use, as for example; sound absorbing material for use as a room divider, or imitation slate or the like to enable the panel 10 to be used as a blackboard, display or bulletin board unit, or the like.

Referring now to FIG. 3, the connector unit 14 is shown to comprise a main shaft portion 32 having spring retaining means such as a plate 34 on the bottom thereof, for retaining a spring 36 in place surrounding the shaft 32 and above the plate 34. This plate 34 is shown at the bottom of the shaft 32, but it will be understood that any suitable location axially inwardly of the outer end thereof could be used. Inside the tubular frame element 18, is disposed a spring retaining means such as a collar 38 held in place by a groove or bead 40 which may be rolled or otherwise formed in the frame element 18.

Fixed to the top of the shaft 32 is a sleeve 42 the axially outer or top edge of which is fixedly attached to a radially outwardly or horizontally extending arm 44. The arm is shown to include an outward gripping extension 46 in this embodiment. Attached to the bottom or inner surface of the arm 44, and disposed generally parallel to the sleeve 42 is a connector sleeve 48. The shaft sleeve 42 and the connector sleeve 48 are of a size so that they may be received somewhat snugly, but still slidably, within the frame elements 18 with which they are associated. Thus, the sleeves 42, 48, when disposed inside the frame elements 18, are sized so as to be readily removable, yet to allow only minimal clearance between the frames 18 and the sleeves, to insure alignment and freedom from excessive play, wobble or the like.

In this embodiment, the sleeves 42, 48 are rectangular in cross-section, when viewed from the top and are disposed inside rectangular frame elements 18, thereby insuring that the two adjacent panels 10, 12 will be in parallel alignment with each other. The provisions of the extensions 46 is optional, but serves to aid in manipulating the connector sleeve 48 and to assist in gripping the arm 44 when it is desired to remove the panels from each other.

Referring now to FIG. 4, the operation of the unit in use is shown. When it is desired to connect two adjacent panels 10, 12, the user may grasp the extension 46 and the arm 44 and lift upwardly thereon, thus compressing the spring 36 between the retaining plate 34 and the retaining collar 38. Thereupon, the connector sleeve 48 may be aligned with the interior opening in the frame element 18 of the adjacent panel, and, on lowering the arm 44, the connector sleeve 48 snaps into place, thus locking the two panels together. Panels previously joined may be disassembled by reversing the steps just described.

In referring to the embodiments just described above, as well as those described below, it will be understood that a bottom connector unit 50 is also provided, so that the adjacent panels 10, 12, may be connected together at the respective top and bottom corners thereof. The construction of the bottom connector 50 may be similar to or identical with the construction of the top connector unit 14, or if desired, the bottom connector may comprise merely a fixed arm 54 attached to a connector sleeve 56 which may be accommodated in the bottom of the frame tube 18. In the event it is desired to allow for some free play at the bottom edges, such as to avoid supporting the panel 12 on the panel 10, if the floor is somewhat uneven or the like, the bottom connector 50 may be identical in all respects with the upper connector 14, except that it will be reversed or a mirror image of the upper connector 14. Thus, orientation of these units is referred to in the claims as "inner" or "outer," meaning such axial directions in relation to the frame element 18.

Thus, panels of the invention may be equipped with one of the connectors described herein, or two connectors, in keeping with the preference of the user.

Referring to the embodiment of the connectors shown in FIGS. 1 through 4, it will be understood that the shaft sleeve 42 and the connector sleeve 48 may be round if desired, whether or not the side frame elements 18 are round. If the sleeves 42, 48 are round, a hinge unit will result, which will be doubly articulated, that is, it will have a movable point about the vertical axis of the shaft 32 as well as a pivot point coaxial with the sleeve 48. On the other hand, either one of the sleeves 42, 48 may be made round, and the other non-circular, that is, of a complementary shape to its corresponding frame element 18. In this case, a connector having a single hinge action would result. If the frame elements 18 is circular, the double articulated hinge construction would result, and the shafts, frame elements, collars and sleeves of the units would comprise a series of concentric cylindrical units.

In the constructions shown in FIGS. 1 thru 4, two frame elements 18 are shown quite close together, so that a hinge action would not characterize this construction. However, lengthening the arm 44 a slight amount will result in a hinged construction, provided that the sleeves 42, 48 are of a circular cross section.

Referring now to FIG. 5, an embodiment is shown in which rectangular side and top frame elements 18 are used, but the shaft sleeve 42 and the connector sleeve 48 are of octagonal or other non-circular profile when viewed in cross section. The arm 44 is somewhat longer than the corresponding arm 44 shown in FIGS. 1 through 4. In addition, the embodiments shown utilize frame elements 18 having interior surfaces 52 with the same octagonal shape, and of a just larger size with respect to the connector sleeves 42, 48. In this manner, it will be seen that a number of different, consecutive, but non-movable positions may be selected by aligning the panels 10, 12 with each other in either a parallel or angular relation, whereupon the mating surfaces formed between the sleeves 42, 48 and the interior surfaces 52 of the frame elements 18 serve to hold the panels 10, 12 in a fixed position. The use of a construction such as this may be desired to facilitate construction of rooms or areas having regular polygonal shapes for example, such as construction of a hexagonal or octagonal teaching or display area, or the like.

Likewise, if panels 10, 12 are provided which do not include the feet 30 having laterally extending supports means thereon, the use of a connector which includes non-circular shaped sleeves 42, 48 may serve to assist in holding the panel structures in an upright position. That is, keeping the panels upright may be accomplished by angling the panels with respect to one another, the offset afforded by the angular disposition of the panels serving to prevent them from falling over to one side or the other, even though the legs 28 do not have side braces or foot members 30 associated therewith. Such construction may also be desired if additional stability is required, for example by reason of supporting displayed objects or the like on the panels themselves.

The materials to be used in constructing the elements of the present invention preferably include wood, metal or composite center section 16 such as those referred to above, and the invention contemplates that the frame elements 18 will be made of mild steel, extruded aluminum tubing, or like material of light weight but good structural strength, and reasonable economy. Fastening the spring-retaining plate 34 and the sleeve 42 to the shaft 32, and fastening of the arm 44 to the two sleeves 42, 48 may be accomplished by welding, brazing or the like, or an assembly including these parts may be made by casting or forging if desired, the method of making such components not being an essential feature of the invention.

It will be thus seen that the present invention provides a new and useful combination panel and connector unit having desirable advantages and characteristics, including those pointed out herein, and others which are inherent in the invention. I contemplate that those skilled in the art may make certain modifications and changes in the units described without departing from the spirit of the invention or the scope of the appended claims.

I claim:

1. A combination panel and connector unit in which the connector unit is adapted to be engaged with a portion of a similar panel, said panel unit comprising, in combination, a panel center section and frame means supporting said center section, said frame means including at least one substantially vertically disposed tubular frame member at each end of said center section, said member having first spring-retaining means therein, and at least one generally U-shaped connector element, comprising shaft means slidingly received in said frame member, second spring retaining means disposed on said shaft, and spaced inwardly from the outer end thereof, spring means disposed between said first and second spring retaining means, said spring means surrounding said shaft, and urging said spring-retaining means apart, an arm secured to said outer end of said shaft and extending radially outwardly therefrom, and a sleeve for engaging a portion of the frame of an adjacent panel, said sleeve being attached to said arm and extending inwardly therefrom, substantially parallel to said shaft, whereby said U-shaped connector, in position of use, connects corresponding parts of the frame portions of two adjacently disposed panels.

2. A combination panel and connector unit as defined in claim 1 in which includes a sleeve disposed closely surrounding said shaft near said outer portion thereof, and inwardly of said arm, said sleeve being of a complementary cross-sectional shape in relation to said frame means and sized so as to fit snugly but slidably therein.

3. A combination panel and connector unit as defined in claim 1 in which said vertically disposed frame member has a non-circular cross-sectional shape, and wherein said sleeve member has a complementary cross-sectional shape in relation to said frame member and is sized so as to allow movement thereof axially of said frame member but to prevent rotation within said frame member.

4. A combination panel and connector unit as defined in claim 3 in which said shapes are hexagonal shapes.

5. A combination panel and connector unit as defined in claim 3 in which said shapes are octagonal shapes.

6. A combination panel and connector unit as defined in claim 1 which includes two of said connector elements, one of said connector elements being disposed at an upper portion of said frame member and the other at a lower portion of said frame member.

7. A combination panel and connector unit as defined in claim 1 which further includes connector means on said unit for connection to the bottom portion of an adjacent panel, said connector means comprising horizontally extending arm means fixed to the bottom portion of said frame element, and a vertically extending sleeve fixed to said arm for receiving a portion of the frame means of an adjacently disposed panel.

References Cited

UNITED STATES PATENTS

| 2,145,030 | 1/1939 | Press | 160—35 X |
| 2,865,124 | 12/1958 | Mortellito | 40—125 |

FOREIGN PATENTS

| 1,313,182 | 11/1962 | France. |
| 1,391,985 | 2/1965 | France. |
| 972,458 | 10/1964 | Great Britain. |

PETER M. CAUN, *Primary Examiner.*

U.S. Cl. X.R.

52—239; 40—125; 160—229